Feb. 2, 1926. 1,571,189
C. DRESSLER
METHOD OF AND APPARATUS FOR DRYING AND CALCINING GYPSUM
Filed Feb. 25, 1920 3 Sheets-Sheet 3
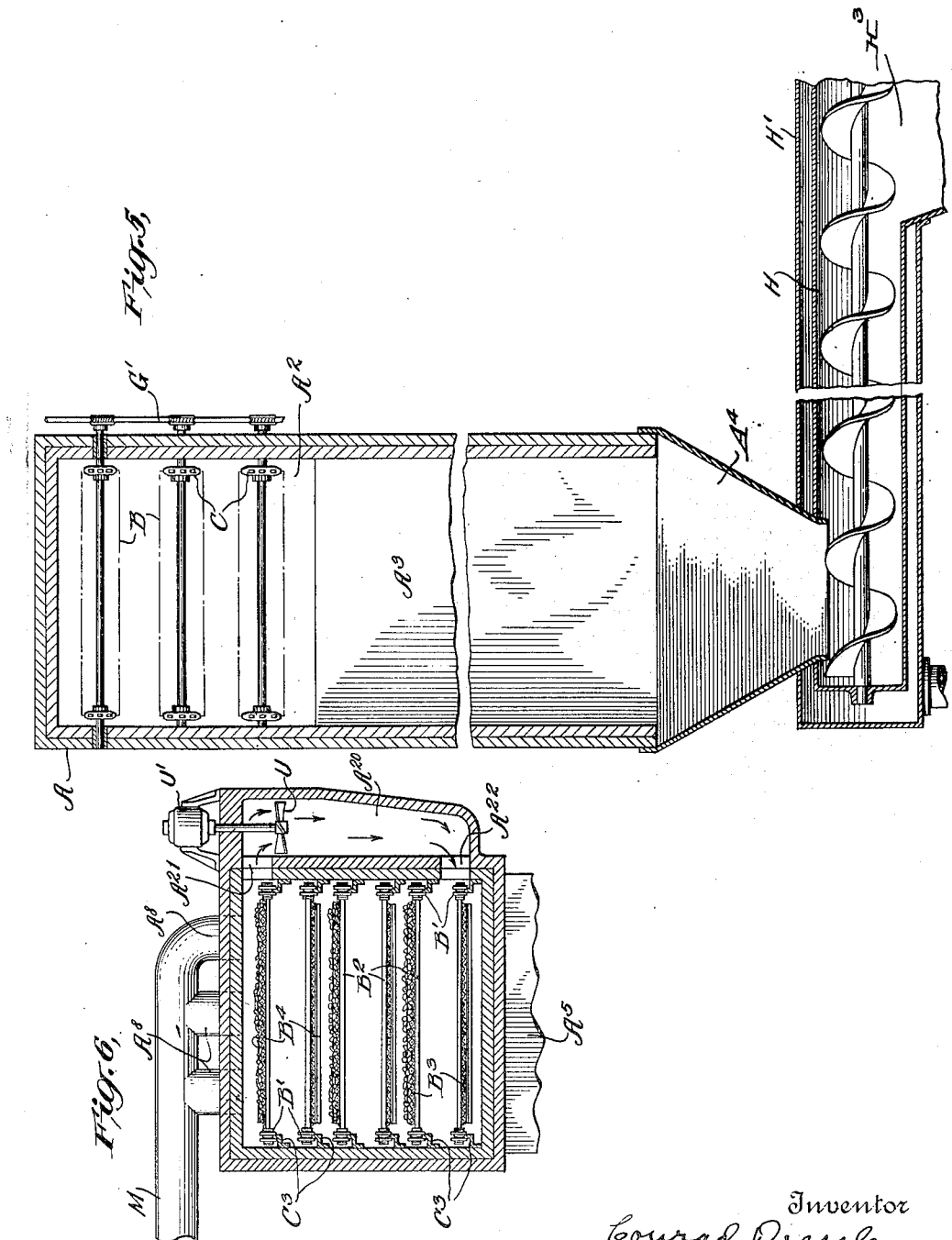
Inventor
Conrad Dressler
By his Attorney
John E. Hubbell Patented Feb. 2, 1926.

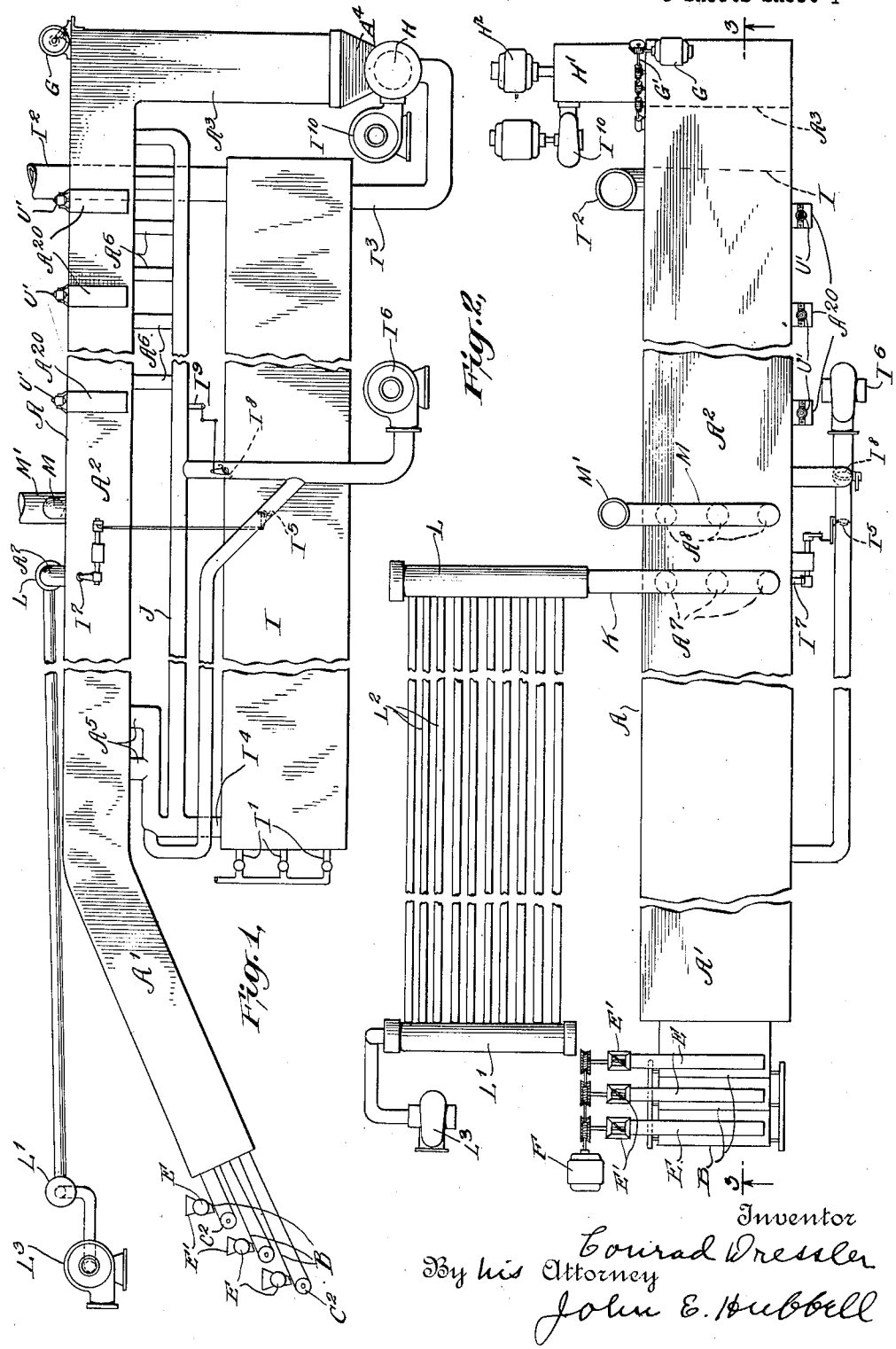

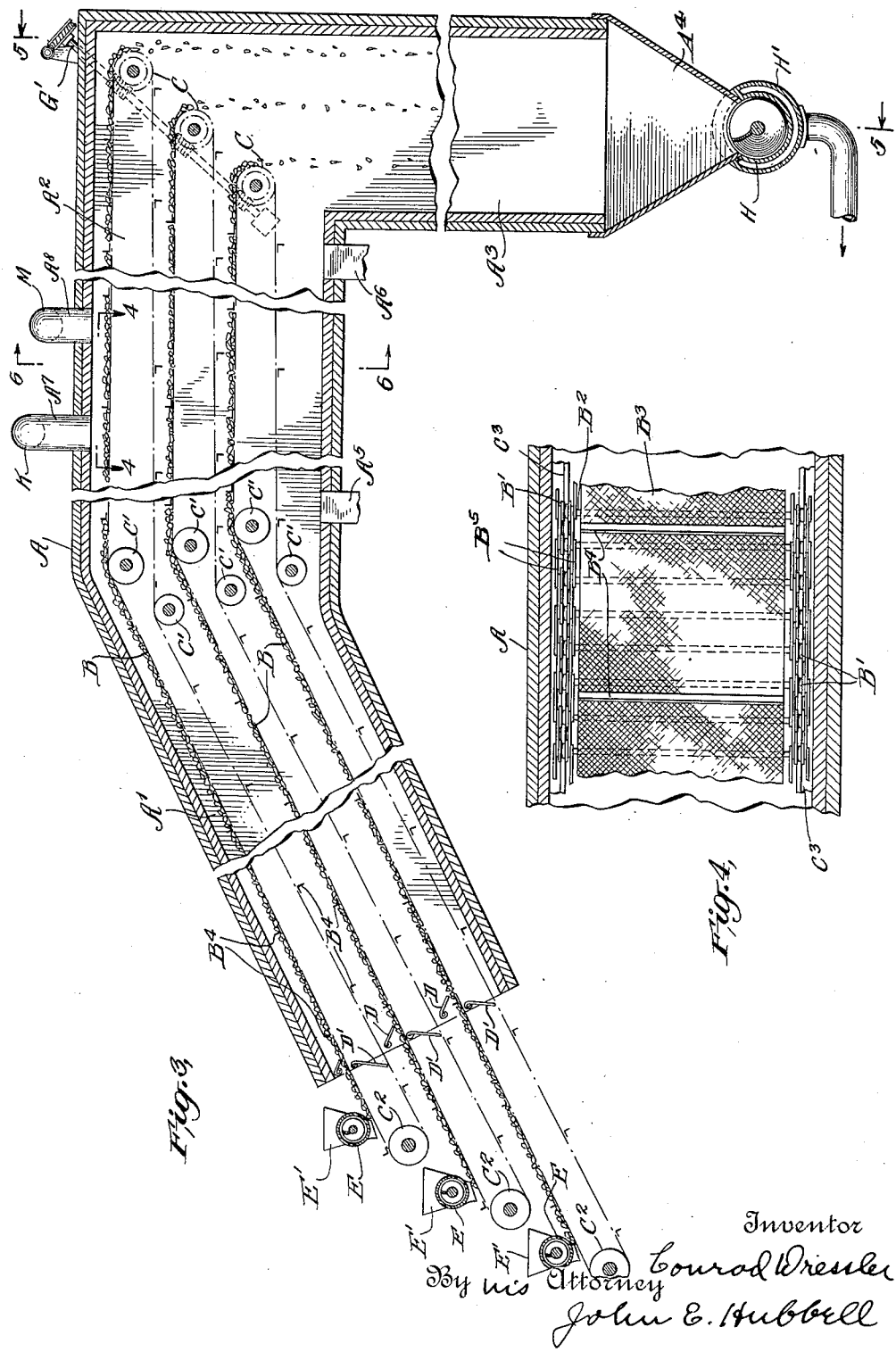

1,571,189

UNITED STATES PATENT OFFICE.

CONRAD DRESSLER, OF NEW YORK, N. Y., ASSIGNOR TO AMERICAN DRESSLER TUNNEL KILNS, INC., OF NEW YORK, N. Y., A CORPORATION OF NEW YORK.

METHOD OF AND APPARATUS FOR DRYING AND CALCINING GYPSUM.

Application filed February 25, 1920. Serial No. 361,239.

*To all whom it may concern:*

Be it known that I, CONRAD DRESSLER, a subject of the King of Great Britain, and resident of New York, in the county of New York and State of New York, have invented certain new and useful Improvements in Methods of and Apparatus for Drying and Calcining Gypsum, of which the following is a specification.

My present invention consists in an improved method of, and apparatus for heating material. My invention in the specific form illustrated and described in detail herein was primarily devised for drying and calcining gypsum by the use of hot air flowing through a drying chamber through which the gypsum is continuously carried, as by means of a suitable belt conveyor or conveyors. The specific form of apparatus disclosed herein is obviously well adapted, however, for drying other materials than gypsum, or for gradually heating up material containing no moisture to be eliminated, and my invention in its broader aspects is capable of use in many different ways and for many different purposes.

The various features of novelty which characterize my invention are pointed out with particularity in the claims annexed to and forming a part of this specification. For a better understanding of the invention, however, and the characteristic advantages possessed by it, reference should be had to the accompanying drawings and descriptive matter in which I have illustrated and described a preferred embodiment of my invention.

Of the drawings:

Fig. 1 is a diagrammatic elevation of a gypsum drying and calcining apparatus;

Fig. 2 is a diagrammatic plan of apparatus shown in Fig. 1;

Fig. 3 is a section on the line 3—3 of Fig. 2;

Fig. 4 is a plan of a portion of the apparatus in section on the line 4—4 of Fig. 3;

Fig. 5 is a section taken on the broken line 5—5 of Fig. 3; and

Fig. 6 is a section on the line 6—6 of Fig. 3.

The particular form of apparatus shown in the drawings comprises a drying chamber A, shown as rectangular in cross-section and provided with suitable heat insulating walls. The chamber A comprises an upwardly inclined entrance section $A'$; an intermediate horizontal section $A^2$; and a depending discharge section $A^3$. The gypsum or other material to be dried or heated is carried through the inclined section $A'$ and the horizontal section $A^2$ by suitable means which, as shown, comprises three belt conveyors B. In the form shown, each belt conveyor B comprises a conveyor web proper $B^3$ which should be porous and may be formed of wire mesh and is supported by transverse shafts $B^2$ having rollers $B'$ journaled on their ends and connected together by links $B^5$. The links $B^5$, rollers $B'$ and shafts $B^2$ form driving chains for the web $B^3$. These chains turn about driving wheels located above the discharge section $A^3$ of the drying chamber A and having shafts connected by suitable external gearing, including a worm shaft $G'$, to a suitable driving means shown as an electric motor G. The conveyor belts run from the driving wheels C through the horizontal section $A^2$ of the drying chamber and then through the inclined portion $A'$ of the chamber. As shown, the conveyors B extend out through the lower end of the chamber portion $A'$. At its lower end each belt chain passes over a corresponding idler wheel $C^2$. Within the drying chamber the belt chains are supported and guided by wheels $C'$ located at the junction of the inclined and horizontal sections $A'$ and $A^2$ of the drying chamber, and by guide rails or tracks $C^3$ secured to the opposite side walls of the drying chamber. The belts B are shown as provided with cleats $B^4$ to prevent slippage of the goods in the travel of the latter through the inclined portion of the drying chamber.

The wheels $C^2$ for the three belt conveyors B are laterally displaced as shown in Fig. 3 to permit the gypsum or other material to be distributed over the different belts as by means of the spiral conveyor feeders E of which there is one for each belt, each feeder being provided with a hopper $E'$ into which the gypsum is shovelled or otherwise fed. The shafts of the three feeders E are shown (see Fig. 2) as all geared to and driven by a suitable motor F. The guide wheels C for the different belt conveyors B are also laterally displaced, as shown in Fig. 3, to permit the material carried by each belt conveyor B to fall freely from the conveyor down through the section $A^3$ of the drying chamber as the material is progressively advanced by the movement of the conveyor B into position above the section $A^3$. The chamber section $A^3$ is provided with a hopper bottom $A^4$ which delivers the dried gypsum to a spiral conveyor H driven by a motor $H^2$ and having a discharge orifice $H^3$. The conveyor H serves to remove the dried gypsum from the drying apparatus.

In its passage through the heating and drying chamber A, the gypsum is heated up, and the moisture driven out of it by hot air which is supplied to the drying chamber from suitable air heating means. The air heating means shown comprises an air heating furnace I having fuel inlets $I'$, an outlet $I^2$ for products of combustion, an inlet $I^3$ for the air to be heated and an outlet $I^4$ for the heated air. I have not thought it necessary to illustrate in detail any particular form of air heating means, as various suitable forms of apparatus for supplying hot air of the required volume and temperature are known. I may advantageously, however, employ the particular form of air heating means disclosed in the patent of Louis Wilputte, No. 1,389,408, granted August 30, 1921. As shown, the air inlet $I^3$ of the heater I is connected to the chamber $H'$ surrounding the gypsum conveyor H. The air passing through the casing $H'$ is atmospheric air and is supplied in proper volume and at proper pressure by the blower $I^{10}$. By forcing the air through the chamber $H'$ before passing it into the heater, I accomplish the double object of preheating the air to some extent and of cooling the gypsum down to, or nearly to, atmospheric temperature.

The heating and drying chamber A is provided with two sets of hot air inlets $A^5$ and $A^6$. The hot air inlets $A^5$ open to the underside of the horizontal section $A^2$ of the heating chamber adjacent the junction of this section with the inclined section $A'$. The inlets $A^6$ open to the underside of the horizontal section $A^2$ of the heating chamber A at points distributed along the length of a portion of the chamber adjacent its junction with the discharge section $A^3$. The hot air outlet $I^4$ is shown as directly connected to the heating chamber inlets $A^5$, and as connected to the hot air inlets $A^6$ by the conduit J. The temperature at which the hot air is supplied to the inlets $A^5$ is regulated by a damper $I^5$ by means of which more or less cool atmospheric air may be admixed with the hot air leaving the furnace I. This air is supplied by a blower $I^6$ in the arrangement shown. The damper $I^5$ is automatically controlled by a thermostat $I^7$ responsive to the air and vapor temperature within the drying chamber adjacent the outlets $A^7$ from the latter hereinafter referred to. The temperature at which the hot air is supplied to the inlets $A^6$ is regulated by means of a damper $I^8$ by which more or less atmospheric air may be supplied by blower $I^0$ mixed with the hot air flowing through the conduit J. The damper $I^8$ is automatically controlled by a thermostat $I^9$ responsive to the temperature of the mixture supplied to the inlets $A^6$.

As shown, the heating chamber A is provided with outlets $A^7$ and $A^8$ for the partially cooled and moisture laden air passing to these outlets from the hot air inlets $A^5$ and $A^6$. The outlets $A^7$ and $A^8$ are located side by side, with the oulets $A^7$ closer to the inlets $A^5$ than are the outlets $A^8$. The outlets $A^8$, of which three are shown, are connected by a bustle pipe M to a stack $M'$ or other apparatus for creating the necessary draft and for discharging the air and moisture issuing from the heating chamber A into the atmosphere. The outlets $A^7$ are similarly connected to a bustle pipe K which is connected to a header L. The latter is connected by a series of pipes $L^2$ to a header $L'$ parallel to header L, from which water of condensation, vapors and air are withdrawn as by means of suitable wet air pump $L^3$. The pipes $L^2$ are shown as slightly inclined to the horizontal so that water of condensation forming in them will drain naturally into the header $L'$. The headers L and $L'$ and the pipes $L^2$ form a condenser for the moisture drawn out of the heating chamber through the outlets $A^7$ and may also serve as a preliminary drier for the crude gypsum before the latter is fed into the hoppers $E'$ of the feeders E.

To restrict the influx of atmospheric air or the efflux of hot air through the lower end of the inclined portion $A'$ and the heating chamber, I provide flap doors D which ride on the material carried into the heating chamber on the upper sides of the belts B, and provide similar but oppositely swinging flap doors $D'$ which ride on the upper sides of the under courses of the belts B.

It will be understood, of course, that the pressures at which hot air is supplied and air and vapor withdrawn from the section $A^2$ of the chamber should be such as to minimize air flow into and out of the ends of the chamber A or through joints which may exist in the chamberwall. The location of the ends of the chamber A at lower levels than the hot portion $A^2$ of the chamber also facilitates the prevention of hot air escaping from, and cold air entering the chamber through openings at its ends.

To increase the heating and moisture absorbing effect of the hot air admitted to the chamber A, mechanical agitation of the chamber atmosphere may be utilized. For this purpose vertical channels $A^{20}$ are provided at the side of the section A² of the chamber A at intervals along the length of the latter. Each of these channels is connected to the top and bottom of the chamber A by ports A²¹ and A²² respectively. In each channel between the ports A²¹ and A²² is a fan U driven by an external motor U'. Each fan, when in operation, draws air out of the chamber A through the corresponding port A²¹ and returns in through the corresponding port A²².

The general mode of operation of the apparatus shown is as follows:

The gypsum to be dehydrated or other material to be heated, with or without a certain preliminary drying or heating on the pipes L² is put into the hoppers E' of the conveyor feeders E, and is uniformly distributed by the latter over the conveyors B. The latter moves the material through the inclined and horizontal sections A' and A² of the heating chamber A and discharges the material into the section A³ through which the material falls freely from the conveyors B. The material thus falling into the hopper bottom A⁴ of the heating chamber section A³ is removed from the heating and drying apparatus by the spiral conveyor H. As the material is removed by the conveyor H it is cooled more or less by the air forced through the jacket chamber H' by the fan or blower I¹⁰. The atmospheric air passed through the jacket chamber H' and thereby partially heated is delivered to the air heater I wherein it is further heated by the combustion of the fuel supplied to the heater through the burner nozzles I'. The hot air issuing from the heater I through its outlet I⁴ is delivered to the air inlets A⁵ and A⁶ of the heating chamber after being tempered in temperature if, and as necessary, by the admixture therewith of atmospheric air supplied by the blower I⁶, passing the air past the dampers I⁵ and I⁸ respectively. The hot air admitted to the heating chamber through the inlet A⁵ passes upward through and about the pervious belts B and the more or less pervious mass of material on the upper sides of these belts and passes longitudinally of the heating chamber toward the outlets A⁷ and A⁸ traveling longitudinally of the heating chamber in the same direction as the material rried by the conveyors B. The hot air entering the heating chamber A through the air inlets A⁶ passes upward through and around the pervious conveyors B and the more or less pervious mass of material on the upper sides of these conveyors and passes longitudinally of the heating chamber in a direction counter to the direction of travel of the material on the conveyor belts toward the outlets A⁷ and A⁸. The air leaving the heating chamber through the outlets A⁷ and the moisture taken up by this hot air passes into the drier condenser L and L² from which the water of condensation, vapors and air are withdrawn by the pump L³. The air and the moisture taken up by it, which leaves the heating chamber through the outlets A⁸ is passed into the atmosphere through the bustle pipe M and stack M'. Preferably, the pump L³ is operated to maintain a suction in the outlets A⁷ bearing such relation to the stack suction exerted in the outlets A⁸ that all of the air entering the chamber A through the inlets A⁵ will be discharged through the outlets A⁷ while all the air entering through the inlets A⁶ will pass out through the outlets A⁸.

In the dehydration of gypsum, the temperature to which the gypsum should be heated varies only between quite narrow limits. Unless the gypsum is heated to a temperature of about 120° C., it will not be thoroughly calcined and if heated above a temperature of about 132° C., the gypsum will be over-burnt and its value for many purposes wholly or largely destroyed. To guard against overheating the gypsum treated in accordance with the present invention, I so regulate the temperatures and volumes of the air admitted to the heating chamber through the inlets A⁵ and A⁶ as to insure that the gypsum will be heated up more or less gradually to a maximum temperature of 132° C., or a little less than this as it passes through the heating chamber sections A' and A². To accomplish this, I automatically maintain the temperature of the air admitted to the heating chamber through the inlets A⁶ at a safe temperature which may well be that of the final temperature of say 132° C., to which the gypsum is to be subjected and I supply this air in sufficient volume to remove the moisture including the water of condensation remaining in the gypsum as the latter passes the outlets A⁷ and to heat the gypsum from its temperature when adjacent the outlets A⁷ to the desired final discharge temperature.

As the gypsum is dried and heated up by the air passing from the air inlets A⁶ to the outlets A⁸, the air falls in temperature and its moisture content increases more or less depending upon the extent to which the gypsum is heated and dried by this air. As the differential in temperature between the air and gypsum decreases and the moisture content of the air increases, the capacity of the air to heat and dry the gypsum diminishes. If it were attempted to remove all the moisture carried by the gypsum on its initial admission to the chamber and to raise the temperature of the gypsum from its initial temperature to the desired discharge temperature by means of air supplied at the safe temperature of 132° C., an enormous volume of this air and a long path of travel of the air in contact with the gypsum would be required. The volume of the air at the safe temperature necessarily supplied thru the inlet A⁶ for completing the dehydration of the gypsum and the elevation of the latter to the proper final temperature and the length of the path in which this air is in contact with the gypsum, are greatly reduced by the stage of operation in which the gypsum is subjected to the action of the air admitted to the heating chamber through the inlet A⁵. This air can be safely supplied in the proper volume at a temperature of say 500° C., which is much higher than the temperature to which the gypsum itself can be safely heated. This is because the gypsum in the portion of the heating chamber in which it is first subjected to the action of the air admitted through the inlet A⁵ is protected from overheating by its moisture content. So long as there is an appreciable amount of free moisture distributed through the gypsum mass, the latter cannot be heated at atmospheric pressure above the boiling point of water, namely 100° C. As the gypsum is moved through the heating chamber from the air inlets A⁵ toward the outlets A⁷, it is rapidly dried and hence is less well protected by the moisture against overheating but the temperature of the air traveling in contact with the gypsum from the inlets A⁵ to the outlets A⁷ falls rapidly in temperature, because of the heat given up by the air in evaporating the moisture content in the gypsum and in heating the latter. The location of the thermostat I⁷, which controls the temperature of the air admitted to the heating chamber through the inlets A⁵ at a point adjacent the outlets A⁷ from the heating chamber forms a means by which overheating of the gypsum in the portion of the heating chamber at the inlet side of the outlets A⁷ is avoided.

While in accordance with the provisions of the statutes, I have illustrated and described the best form of embodiment in my invention now known to me, it will be apparent to those skilled in the art that changes may be made in the form of apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The two-stage method of continuously heating material which consists in moving the material in a stream through an elongated heating chamber comprising two heating zones and subjecting the material in its passage thru the first zone traversed to the action of a stream of a highly heated gaseous fluid flowing in the same direction as the material and subjecting the material in its passage through the second zone to the action of a stream of less highly heated gaseous fluid.

2. The two stage method of continuously heating material which consists in moving the material in a stream through an elongated heating chamber comprising two heating zones and subjecting the material in its passage through the first zone to the action of a stream of a highly heated gaseous fluid flowing in the same direction as the material and subjecting the material in its passage through the second zone to the action of a stream of a less highly heated gaseous fluid moving in a direction opposite to that in which the material moves.

3. The method of drying material without raising the temperature of the material above a predetermined maximum, which consists in creating a stream-like movement of the material through an elongated drying chamber comprising two drying zones and in subjecting the material in its passage through the first zone traversed to the action of a stream of gaseous fluid moving in the same direction as the material and initially engaging the material while at a temperature substantially above said predetermined temperature, and in subjecting the material in its passage through the second zone to the action of a stream of gaseous fluid initially engaging the material at a temperature approximately equal to said predetermined temperature.

4. The method of drying material by the use of a gaseous fluid without raising the temperature of the material above a predetermined maximum which consists in creating a stream-like movement of the material through an elongated drying chamber comprising two drying zones and in subjecting the material in its passage through the first zone traversed to the action of a stream of gaseous fluid moving in the same direction as the material and initially engaging the material while at a temperature substantially above said predetermined temperature and in subjecting the material in its passage through the second zone to the action of a stream of gaseous fluid moving in a direction opposite to that in which the goods move and initially engaging the material at a temperature approximately equal to said predetermined temperature.

5. A goods heating apparatus comprising a horizontally elongated heating chamber terminating at one end in a depending discharge portion, a plurality of belt conveyors for transporting material to be heated through the horizontal portion of the drying chamber, said belt conveyors being longitudinally displaced with respect to one another so that material discharged from each upper belt at the discharge end of the apparatus, may fall into said discharge portion without contact with a lower belt.

6. Apparatus for heating material comprising a horizontally elongated heating chamber terminating at one end in a depending portion, means for transporting material to be heated through the body portion of said chamber, comprising a plurality of conveyor belts longitudinally disposed in said body portion and arranged one above another and being longitudinally displaced with respect to one another so that at the discharge end of the chamber each upper belt projects beyond the belt or belts beneath it and so that at their opposite ends each lower belt extends beyond the belt or belts above it.

7. The combination of a horizontally elongated chamber and means for transporting material through said chamber, comprising a plurality of conveyor belts longitudinally disposed in the body portion of said chamber one above another and longitudinally displaced with respect to one another so that at the discharge end of the chamber each upper belt projects beyond the belt or belts beneath it, and so that at the opposite end of the chamber, each lower belt extends beyond the belt or belts above it.

8. The combination with a horizontally elongated chamber, of means for transporting material through said chamber comprising a plurality of conveyor belts longitudinally disposed in said chamber and arranged one above the other and longitudinally displaced with respect to one another so that the discharge end of each upper belt projects beyond the discharge end of any lower belt thereby permitting the material discharged by each upper belt to fall clear of each lower belt.

9. The combination with a horizontally elongated chamber of means for transporting material through said chamber comprising a plurality of conveyor belts longitudinally disposed in said chamber and arranged one above another and longitudinally displaced with respect to one another so that one end of each lower belt projects longitudinally of the chamber beyond the corresponding end of any upper belt and means for discharging material to be transported on to the upper belt and onto the end portions of the lower belts exposed by said displacement.

10. Bulk drying apparatus comprising in combination a heating chamber comprising an upwardly inclined entrance portion, a horizontally disposed intermediate portion and a depending discharge portion, means for transporting material to be heated progressively through said entrance and intermediate portions and dropping it into said discharge portion and means for injecting a hot gaseous fluid drying agent into said chamber and for withdrawing said gases and vapors from an upper portion of said chamber.

11. In apparatus of the character specified, the combination with a chamber comprising two zones, meeting end to end and in open communication with one another at their meeting ends, said chamber having an outlet or outlets for gases and vapors, of means for moving goods to be treated first through one and then through the other of said zones, means for supplying a more highly heated gaseous heating agent to one zone of said chamber and means for supplying a less highly heated gaseous heating agent to the other zone of said chamber.

12. In a continuous drier the combination with a drying chamber comprising two zones placed end to end and having an outlet or outlets for gases and vapors opening from a portion of the chamber adjacent the junction of said zones, of means for moving material to be dried first through one and then through the second of said zones, means responsive to the temperature in the drying chamber adjacent said outlets controlling the supply of heated gaseous drying agent to said chamber adjacent the end of the first mentioned zone remote from said second zone and means for supplying a heated gaseous drying agent to the second zone of said drying chamber.

13. In a continuous drier the combination with a drying chamber comprising two zones meeting end to end, of means for withdrawing gases and vapors from a portion of said drying chamber adjacent the junction of the two zones, means for moving material to be dried first through one and then through the second of said zones, means for supplying a hot gaseous drying agent to said chamber adjacent the end of said one zone remote from said second zone, means regulating the temperature of said agent in response to the temperature in said portion of the chamber, so as to prevent the temperature in said portion of the drying chamber from exceeding a predetermined maximum and means for supplying a hot gaseous drying agent to the second zone.

14. In a continuous drier the combination with a drying chamber comprising two zones, meeting end to end and having an outlet or outlets for gases and vapors opening from a portion of said chamber adjacent the junction of said zones, of means for moving goods to be dried first through one and then through the other of said zones, means for supplying a heated gaseous drying agent to said one zone of chamber, means for increasing and decreasing the temperature of said agent accordingly as the temperature in said chamber falls below or rises above a predetermined normal, and means for supplying a heated gaseous drying agent to the second zone of said chamber.

15. In a continuous drier, the combination with a drying chamber comprising two zones placed end to end and having an outlet or outlets for gases and vapors opening from a portion of the chamber adjacent the junction of said zones, of means for moving material to be dried first through one and then through the second of said zones, means responsive to the temperature in the drying chamber adjacent said outlets controlling the supply of a gaseous drying agent to said one zone of said chamber at a temperature varying inversely with the temperature to which said means is responsive, and means for supplying a heated gaseous drying agent of approximately constant temperature to the second zone of said drying chamber.

16. In a continuous drier, the combination with a drying chamber comprising two zones placed end to end and having an outlet or outlets for gases and vapors opening from each zone of said chamber, of means for moving material to be dried first through one and then through the second of said zones, means supplying a highly heated gaseous drying agent to said one zone of said chamber, and means for supplying a less highly heated gaseous drying agent to the second zone of said drying chamber, and a preliminary drier connected to the outlet from said one zone and heated by the gases and vapors issuing from said outlet.

17. In a continuous drier the combination with a drying chamber comprising two zones meeting end to end, and having an outlet for gases and vapors from each zone, of means for exerting a suction effect on said outlets including provisions for regulating the relative suction effects exerted in the two outlets, means for moving material to be dried first through one and then through the other of said zones, means for supplying a more highly heated gaseous drying agent to said one zone of said chamber, and means for supplying a less highly heated drying agent to the second zone of said chamber.

18. In a continuous drier, a drying chamber having an intermediate portion bodily elevated above its end portions, means for moving material into said chamber through one portion and transporting it through said chamber and for moving it out of said chamber through the other end portion, means for introducing a gaseous heating agent into said intermediate portion of said chamber and means for withdrawing gases and vapors from said chamber.

19. Drying apparatus comprising in combination a horizontally disposed chamber provided at one end with the depending discharge portion and a conveyor mechanism for removing material fed into said discharge portion, means for moving material to be dried through said chamber to said discharge portion from the other end of the chamber, an air heater supplying air to the drying chamber, means for supplying said air heater with the air to be heated comprising provisions for utilizing said air in cooling said conveyor mechanism and thereby preliminarily heating the air.

20. In apparatus of the character specified, the combination with a heating chamber comprising depending end portions and a connecting intermediate portion which is horizontally elongated and bodily elevated above the end portions, means for conveying goods through said heating chamber and means for heating said central portion of the heating chamber.

Signed at New York in the county of New York and State of New York this 24th day of February A. D. 1920.

CONRAD DRESSLER.